United States Patent

[11] 3,599,607

| [72] | Inventor | Sherwin Wallick<br>5120 Del Monte #9, Houston, Tex. 77027 |
|---|---|---|
| [21] | Appl. No. | 884,865 |
| [22] | Filed | Dec. 15, 1969 |
| [45] | Patented | Aug. 17, 1971 |

[54] APPARATUS FOR METERING AND SAMPLING MILK
12 Claims, 6 Drawing Figs.

[52] U.S. Cl. .................................................. 119/14.17, 73/217
[51] Int. Cl. .............................................................. A01j 07/00
[50] Field of Search .......................................... 119/14.14, 14.15, 14.16, 14.17; 73/217, 219, 220

[56] References Cited
UNITED STATES PATENTS
2,566,729  9/1951  Knaggs ........................ 119/14.17
3,056,294  10/1962  Brown et al. ...................... 73/200
3,200,643  8/1965  Porterfield ....................... 73/200

Primary Examiner—Hugh R. Chamblee
Attorney—Charles E. Lightfoot

ABSTRACT: An improved metering and sampling apparatus for use with automatic milking machines. A chamber is provided with a paddle wheel which is arranged to be rotated by the flow of milk from the cow to the milking machine. Magnets may be disposed in the blades of the paddle wheel for actuating a detector or magnetically actuated switch located outside the chamber and connected to electrical counting circuitry. A separate portion of the interior of the chamber may be located to collect a sample of the milk being taken from the cow, and means is preferably provided for retrieving the sample without interrupting the milking and metering operation.

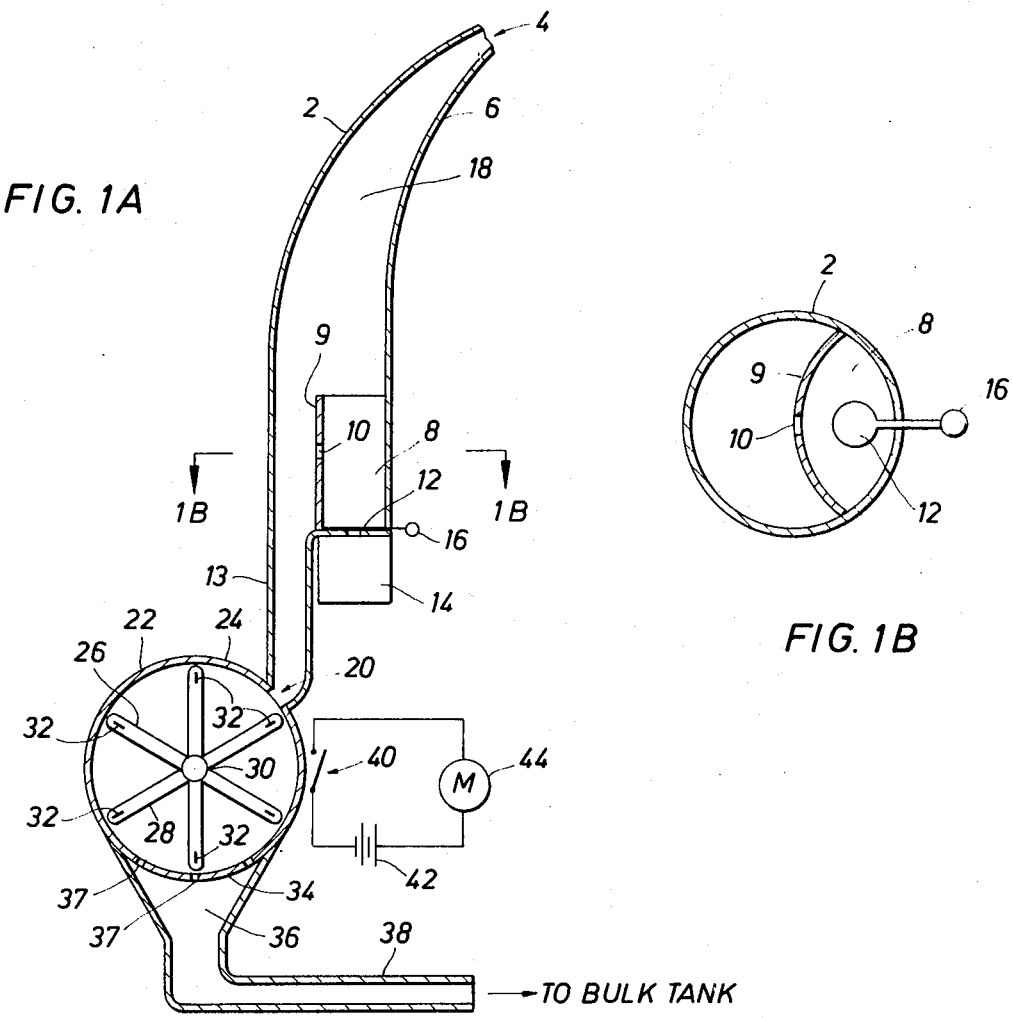
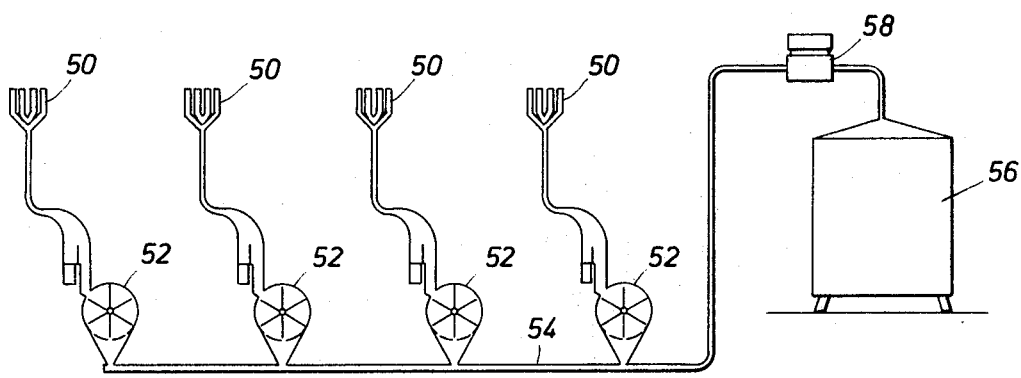

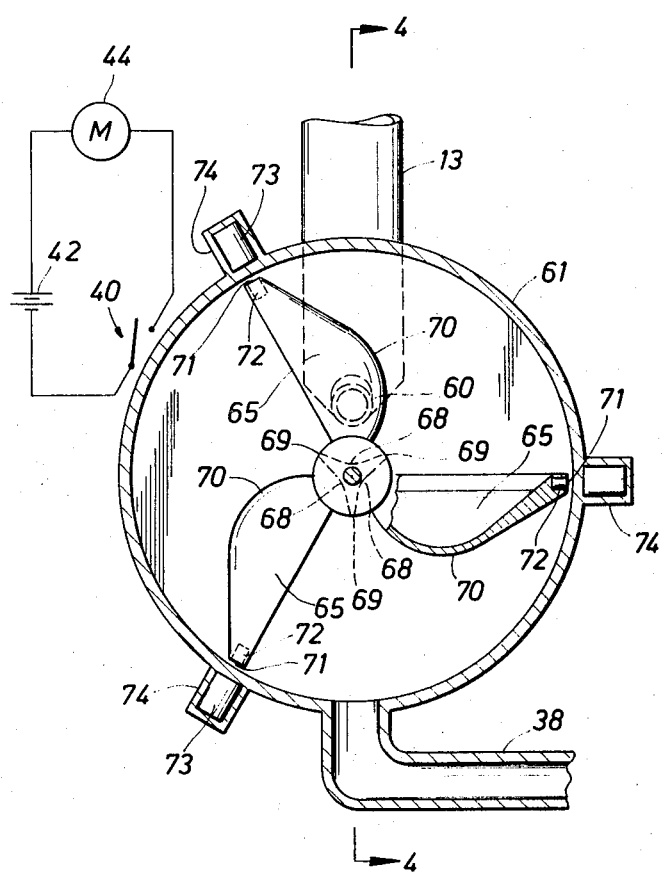
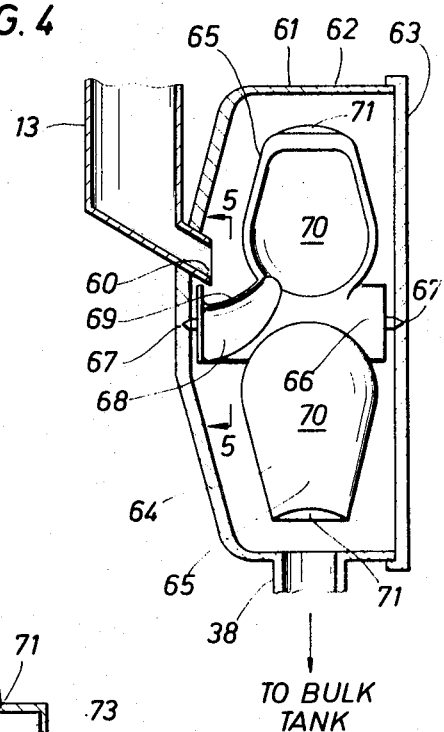
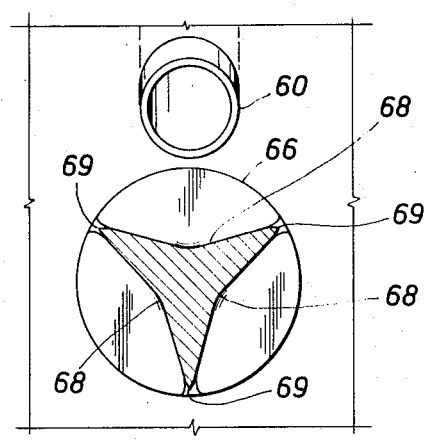
FIG. 3
FIG. 4
FIG. 5
TO BULK TANK
Sherwin Wallick
INVENTOR
BY Arnold, Roylance,
Kruger & Durkee
ATTORNEYS

APPARATUS FOR METERING AND SAMPLING MILK

BACKGROUND OF INVENTION

This invention relates to apparatus for fluid flow measure, and more particularly relates to apparatus for measuring and sampling the milk drawn from dairy cattle by automatic milking machines.

It is well known that cow's milk has long been a significant part of the diet of humans. Until about the turn of the century, the cows were milked by hand, the milk was collected and stored by the herdsmen in simple containers, and thereafter the collected milk was either marketed by the herdsman generally directly to the ultimate consumer or was sold to a distributor. Since most of the nation's population lived in substantially rural areas, much of the milk was consumed either by the producer or by people located relatively near the herd. Furthermore, the herds were relatively small in number, and pasturage was easily and cheaply had. Thus, although prices were generally low, production and handling costs were very low and relatively easily controlled. Furthermore, quality and purity controls were generally nonexistent and thus were not a factor in the cost of the milk.

The market milk industry, as a major industry, is of relatively recent origin and its growth essentially parallels the shift of the nation's population from the rural areas to the cities. During this shift, effort was made to supply the necessary milk to the city populace by dairy farmers adjacent the cities, and by keeping cows in the cities. These practices have now been largely discontinued, not only because of the press of economics, but because of the enforcement by federal, state, county, and city authorities, of strict quality and purity controls. Furthermore, since market milk is now gathered from herds located over very wide areas, the production of milk has been substantially divorced (insofar as proprietorship is concerned) from the function of collecting, processing, and distributing the milk. Since the purity and quality controls exercised by municipal authorities have generally been directed to the processor and distributor of the milk, the processor distributor has in turn been compelled to apply controls to the producer, and often these controls have been the most exacting and economically burdensome. Consequently, the milk producer has been compelled to adopt complicated and expensive mechanical milking and handling equipment, not only so as to meet sanitation standards imposed by both buyer and government, but to reduce his production and handling costs.

Dairy cattle are well known to differ substantially in both the quantity and the quality of the milk they give, and this difference will be manifested from cow-to-cow as well as from herd-to-herd. Of course, the purchaser is not generally concerned with the quantity of milk given by a single cow, nor even with the quality thereof except as to matters of disease, since he generally buys the output of the herd on a bulk basis. However, the producer or herd operator must consider each cow a separate "milk factory," and cows which either produce under the average quantity, or which produces substandard milk, is of primary concern. Before mechanization of the milking and collecting functions, it was a relatively simple matter to determine the quantity and quality of the milk produce by each cow in the herd, since the milk from each cow was drawn manually into individual pails before being manually collected into large milk cans. Thus, the milker could readily compare the production of one cow to another by merely comparing the contents of the pails. Quality control was usually limited to the matter of the relative butterfat content of the milk, and this was easily determined by visual inspection. Such simple control methods cannot now be so easily practiced with the advent of mechanical milking, since modern milking apparatus draws the milk simultaneously from several cows, and delivers it directly to one or more bulk tanks. In the typical milking operation, as many as 50 cows will pass at one time to the "milking parlor" where attendants clean their udders and teats and then attach the milking machines. The milk from each cow will be drawn simultaneously to and commingled in a glass piping network which conducts it to the collecting vat. Thus, unless the milk from a single machine is diverted to a separate container or collection point, there is no practical manual method of determining the quality and quantity from a single cow.

Thus, various forms of apparatus have been proposed for metering and sampling the milk drawn from dairy cattle by automatic milking machines. Most of these proposed devices have been substantially the same as fluid metering and sampling devices used in other industries. However, no other industry is subject to the bacterial control problems of the magnitude affecting the dairy industry, wherein all equipment must operate to completely isolate the milk from the surrounding environment. Moreover, no other industry requires equipment which must be designed so as to be easily cleansed after use, such cleansing to render the components part absolutely free from either bacteria or from milk deposits which would provide a medium for bacterial development. Thus, apparatus suitable for metering and sampling other types of industrial fluids have been found to be entirely unsuited to the present purposes.

One type of metering apparatus now in commercial use in dairies comprises a pair of buckets mounted at each end of a pivotally mounted rocker arm. The apparatus is designed to direct the milk into first one bucket, and then into the other. When the first bucket is filled, the rocker arm tilts to dump the milk into a discharge outlet, and to position the other bucket to receive milk. Means is provided to count the number of times the rocker arm tilts in each direction, since the capacity of each bucket is predetermined. The buckets and rocker arm are, of course, contained in a housing to prevent exposure of the milk to bacteria. Although this meter has been accepted by the industry, it is difficult to clean because the milk system is generally cleaned by forcing a detergent fluid back through the entire system, and the meter will not "flow backward." Furthermore, the rocker arm is adapted so that it will not tilt and empty a bucket until that bucket has been completely filled. Thus, the function of the meter is quite erratic and unreliable, since a cow tends release her milk in irregular spurts, rather than as a steady flow.

SUMMARY OF INVENTION

These disadvantages of the prior art are overcome with the present invention, and novel apparatus is provided which may be cleaned as a part of the overall milking system which operates with much greater accuracy, and which includes provision for the taking of samples of the milk drawn from the cow without the necessity of disconnecting any portion of the milking system.

Accordingly, it is an object of the present invention to provide improved apparatus for metering the production of milk from a cow.

It is another object of the present invention to provide improved apparatus for metering the production of milk from an individual cow, while the cow is being milked by means of mechanical milking apparatus.

It is further an object of the present invention to provide improved apparatus for metering the production of milk from a cow being milked by a mechanical milker, including novel provision of means for taking a sample of such milk during the milking process.

The advantages of the present invention are preferably attained by apparatus which includes a jacket housing a turbine or paddle wheel, and having a milk intake arranged to direct milk against the paddles on one side of the turbine. The paddle wheel is adapted to turn, upon receiving the milk, to pass the milk to a milk outlet. The milk meter also includes provision for measuring the fractions of paddle wheel rotation defined by adjacent paddles, and further includes provision for withdrawing a preselected sample of milk without interruption of the action of either the metering portion of the present invention, or of the milking system of which it is an integral part.

These and other objects and features of the present invention will be apparent from the following detailed description wherein reference is made to the figures of the accompanying drawings.

DRAWINGS

FIG. 1A is a simplified pictorial representation of one embodiment of the present invention, and more particularly depicts the essential features of a combination milk meter and sampling means.

FIG. 1B is a simplified pictorial representation of another view of the apparatus suggested in FIG. 1A, and more particularly depicts certain operating features of the sampling means not emphasized in FIG. 1A.

FIG. 2 is a simplified functional representation of a milking system incorporating the embodiment of the present invention depicted in FIGS. 1A and 1B.

FIG. 3 is a simplified pictorial representation of a modified form of a portion of the apparatus depicted in FIGS. 1A and 1B.

FIG. 4 is a different pictorial representation of a portion of the apparatus depicted in FIG. 3.

FIG. 5 is another different pictorial representation of a particular portion of the apparatus depicted in FIGS. 3 and 4.

DETAILED DESCRIPTION

The typical mechanical milking system generally includes a series of milking machines attached to the udders of each cow in the milking parlor, and a vacuum system for drawing the milk from each cow. Each milking machine comprises a small vat or tank having four tight fitting intake cups adapted to be attached to the teats, and having a single outlet means interconnected with a glass pipe manifold. Thus, the vacuum system draws the milk from each cow into its respective milking machine tank, and from each tank through the manifold into a collection vat. As will hereinafter be seen, the present invention may be attached between the outlet of the milking machine and the pipe manifold if the production from a particular cow is sought to be tested. On the other hand, the present invention may be connected between the outlet of the manifold and the collection vat, if the total production of the herd is sought to be metered.

Referring now to FIG. 1A, there may be seen a housing 2 having an intake port 4 for connection to the outlet of the milking machine (not depicted) or to any other appropriate point in the milking system. The portion of the housing 2 adjacent the intake port 4 is preferably formed to provide a sloping throat 6, as may be seen in FIG. 1, so that the spurts of milk entering the housing 2 will tend to pass directly into a separate compartment which will hereinafter be referred to as the sample chamber 8.

The sample chamber 8 is preferably arranged in the manner of a pocket mounted on one side of the interior of the housing 2 so as to receive the spurts of raw milk which tend to flow down the said housing 2 adjacent the aforementioned throat 6. In FIG. 1B, there is depicted in cross-sectional view a representation of the housing 2 and sample chamber 8, showing how the sample chamber 8 is formed of a relatively semicircular baffle 9 mounted inside the housing. The baffle 9 is preferably provided with a port 10 suitably located so that an adequate amount of raw milk will remain in the sample chamber 8 to provide a sample, and so that excess amounts will overflow through the port 10, and will thereafter flow down and through the downspout 13 and the outlet 20 to the milk meter 22, after churning and mixing with the amount retained in the sample chamber 8. Since the first spurts of milk from the cow are always different in character from that of the milk as a whole, this churning and mixing operation provides that the milk taken for sampling purposes will be representative of the overall production, rather than of only the first milk to fill the sample chamber 8.

The bottom of the sample chamber 8 is preferably provided with a detachably connected sample holder 14, and with a horizontally slidable gate valve 12. When it is sought to draw a sample of the milk production, the gate valve 12 may be easily opened by means of the handle 16, and the milk retained in the sample chamber 8 will drop through into the sample holder 14 for easy removal.

The milk composed of a circular meter housing 24 having a turbine assembly 26 rotatably mounted therein. The turbine assembly 26 is composed of a series of blades 28 equidistantly arranged about a central hub or axis 30 so as to be rotated unidirectionally by incoming spurts or flows of milk from the outlet 20 of the housing 2. Each blade 28 is preferably provided with a small magnet 32 in its tip which serves to momentarily close, or otherwise actuate a magnetic switch 40 located outside, but adjacent to, the meter housing 24. The switch 40 is connected with a power supply 42 and a suitable recorder 44.

The milk meter 22 is preferably adapted so that the turbine assembly 26 accepts a predetermined quantity of milk between each pair of adjacent blades 28, and so that such quantity is sufficient to cause the turbine assembly 26 to rotate so as to empty or dump the milk into the bottom 36 of the milk meter 22. A perforated baffle 34 is preferably located at the conically shaped bottom 36 to direct the milk into the system intake line 38 which leads to the bulk collection tank (not depicted). Although the milk is expected to pass by gravity flow, through the housing 2, and through the meter housing 24, the vacuum system (not depicted) which draws the milk from the cow into the housing inlet 4, will draw the milk in the system intake line 38 to the bulk collection tank. Although the perforated baffle 34 is referred to herein as "perforated," it is not expected to operate in the manner of a sieve or strainer. Rather, it serves merely to temporarily accumulate a pool of milk to provide resistance to free rotation of the turbine assembly 26, and therefore need be provided with only two or three holes 37 as indicated.

Referring now to FIG. 2, there may be seen a schematic representation of a typical milking system showing the teat cup assemblies 50 leading to the milk meters 52 which each, in turn, lead to the system intake line 54 connected to deliver milk to the bulk collection tank 56. The vacuum is provided by any suitable means, such as a pump 58 as depicted. Although the depicted system shows each teat cup assembly 50 connected to a separate milk meter 52, it will be apparent that only one milk meter 52 may be connected downstream from the last teat cup assembly 50 if it is necessary or desirable to merely meter the total production of the herd.

During the milking operation, the flow of raw milk tends to develop a substantial quantity of foam. In the systems presently in use, the foam tends to clog the system intake and collection lines running between the milking machines and the bulk collection tank 56. In the present invention, the housing 2 which encloses the sample chamber also defines a foam collection chamber 18 which serves to trap all such foam to prevent it from clogging the operation of the turbine assembly 26.

One particular advantage of the present invention not hereinbefore described is the facility with which the samples may be taken. In the systems now in use it is necessary to disconnect the vacuum before a sample can be taken. In the present invention, however, a sample is taken by merely opening the gate valve 12 to allow the contents of the sample chamber 8 to drop down into the sample holder 14. The gate valve 12 is then closed, and the sample holder 14 removed, without the necessity of interrupting either the vacuum or the milking operation.

Another advantage lies in the fact that the present invention permits the milk meter assembly to be easily cleaned without disconnecting it from the system. The teat cup assemblies 50 need only be disconnected from the udders of the cows, and a jet or surge of cleansing fluid applied forcefully to the outlet end of the system intake line 38. The injected cleansing fluid will travel up across the turbine assembly 26, and through the foam and sample chambers 18 and 8, to thoroughly flush out the apparatus depicted in the accompanying drawings.

Referring now to FIGS. 3—5, there may be seen a modification of a portion of the apparatus depicted in FIGS. 1—2. More particularly, the metering chamber 61 may be seen to be conveniently formed of a circular housing 62 with a closure plate 63 but snugly fitted about one side. As may further be seen in FIGS. 3—5, the downspout 13 depicted in FIGS. 1—2 may be provided with a convenient pouring spout 60 which is inserted into the interior of the metering chamber 61.

In this embodiment of the invention, the turbine assembly 64 may be composed of an axle 66 with pointed centrally positioned bearings 67 at each end for rotatable engagement with the interior surfaces of the housing 62 and closure plate 63, and carrying three equally spaced-apart spoons 65 for catching milk which flows down through the downspout 13, and is discharged into the chamber 61 by way of the pouring spout 60. As in the previous embodiment, the milk is collected in the bowls 70 of each spoon 65, and this causes the turbine assembly 64 to rotate to thereafter dump the contents of each spoon 65 into the bottom of the chamber 61. Milk collecting in the bottom of the chamber 61 will, of course, be drawn to the bulk tank 56 by way of a suitable collection line 38.

The metering assembly depicted in FIGS. 3—5 may include a counting system of the type depicted in FIGS. 1—2. Accordingly, a magnetically actuated single pole, single throw switch 40 may be positioned adjacent the wall of the metering chamber 61 for actuation by the proximity of suitable signaling magnets 72 which are located in the tip 71 of each of the three spoons 65 in the turbine assembly 64. Closure of the switch 40 will permit current flow from the power supply 42 through a suitable counting meter 44, as hereinbefore explained.

It will be noted that the metering system depicted in FIGS. 3—5 does not include a perforated baffle 34 of the type depicted in FIG. 1A. Accordingly, in order to prevent the turbine assembly 64 from rotating too freely and thereby inaccurately actuating the switch 40, one or more detent magnets 73 may be suitably mounted about the exterior of the metering chamber 61 in convenient magnet housing 74, as indicated in FIG. 3. In such an arrangement, the detent magnets 73 should be of a strength sufficient to restrain free rotation of the turbine assembly 64 when the spoons 65 are empty. However, when one of the spoons has been substantially filled with milk from the pouring spout 60, the weight of the milk in the bowl 70 of that spoon 65 should be sufficient to overcome the restraining force of the detent magnet 73, and thus the turbine assembly 64 should then rotate until the contents of that spoon 65 are dumped into the bottom of the chamber 73 will again "engage" magnets 72 mounted in the tips 71 of each spoon 65, to restrain further rotation of the turbine assembly 64 until milk again is collected in one of the spoons 65.

Referring again to FIGS. 3—5, it will be seen that the spoons 65 have straight tips 71, and that they have backwardly sloping bowls 70 with the deepest portion of each bowl closer to the axle 66 than to its corresponding tip 71. This is to permit the milk to flow easily from the pouring spout 60 into the spoon 65 which is positioned to receive milk from the spout 60 without spilling over the edges of the spoon 65. It will further be noted that the axle 66 is formed with a generally triangular configuration to provide three separate flow channels 68 which each lead to a different one of the three spoons 65. Moreover, each of these three flow channels 68 is separated from the other by a relatively sharp dividing edge 69 which, when brought under the pouring spout 60, tends to route the milk into the appropriate one of the flow channels 68. The advantage of the relatively sharp dividing edge 69 is to provide for instant diverting of the milk issuing from the pouring spout 60 from one flow channel 68 to another as the turbine assembly 64 is rotated in the metering chamber 61.

Numerous other variations and modifications may obviously be made without departing from the invention. Accordingly it should be clearly understood that the forms of the invention described above and shown in the figures of the accompanying drawings are illustrative only, and are not intended to limit the scope of the invention.

What I claim is:

1. Apparatus for metering the flow of milk taken from a milk-producing animal, comprising
    a nonmagnetic housing having a generally circular metering chamber portion located intermediately of an intake port and an exit port,
    metering means rotatably positioned in said chamber of said housing and having a plurality of equally spaced-apart arm portions segmentally dividing the interior of said chamber and arranged to sequentially and yieldably block milk flow through said chamber,
    a plurality of actuating magnets each mounted in the tip portion of one of said arm portions of said metering means adjacent the wall of said chamber of said housing,
    magnetically actuated indicating means mounted adjacent the exterior of said chamber of said housing, and
    retarding means interconnected with said housing for yieldably opposing rotation of said metering means in said chamber portion of said housing.

2. The apparatus described in claim 1, wherein said arm portions of said metering means are arranged such that one of said arm portions is always interposed between said intake and exit ports of said housing to intercept milk flow therebetween.

3. The apparatus described in claim 2, wherein said housing further includes a sample chamber portion located intermediately of said intake port and said metering chamber for catching and retaining a portion of any milk taken from said animal.

4. The apparatus described in claim 3, wherein said sample chamber portion of said housing comprises
    a barrier wall combined with the interior surface of said housing to form an open-ended pocket,
    valve means interconnected with said housing adjacent the lower portion of said pocket formed by said barrier wall, and
    container means releasably attached to the exterior of said housing adjacent said valve means.

5. The apparatus described in claim 4, wherein said metering means comprises
    a paddle wheel assembly of bladelike members axially mounted concentrically in said metering chamber portion of said housing and rotatable by milk entering said metering chamber portion of said housing from said intake port, and
    a perforated baffle interposed between said exit port and said metering chamber portion of said housing for accumulating a quantity of said milk passing from said metering chamber portion and for supporting said accumulated milk to retard arcuate movement of the adjacent ones of said bladelike members of said paddle wheel assembly.

6. The apparatus described in claim 5, wherein said perforated baffle is a semicircular wall means interposed adjacent the tips of adjacent ones of said bladelike members for supporting said accumulated milk in a manner to partially immerse said adjacent bladelike members.

7. The apparatus described in claim 4, wherein said metering means includes
    an axle portion mounted concentrically in said metering chamber portion of said housing and rotatable therein about its longitudinal axis, and
    a plurality of spoonlike portions spaced about said axle portion for sequentially intersecting and catching a portion of said milk taken from said animal and entering said metering chamber portion of said housing from said intake port.

8. The apparatus described in claim 7, wherein each of said spoonlike portions of said metering means is arranged to collect an amount of said milk from said intake port which is sufficient to overcome said retarding means and to rotate said metering means.

9. The apparatus described in claim 8, wherein said axle portion of said metering means is provided with a plurality of channels each communicating with one of said spoonlike portions and each further located to receive milk from said intake port and to conduct such received milk into said one of said spoonlike portions.

10. The apparatus described in claim 9, wherein said channels are grooves located about said axle portion of said metering assembly such that said grooves are separately and sequentially presented to said intake port by rotation of said axle portion in said metering chamber.

11. The apparatus described in claim 10, wherein said retarding means includes
  detent magnet means mounted on the exterior of said housing about said metering chamber portion for attracting said actuating magnets in said metering assembly.

12. The apparatus described in claim 11, wherein said retarding means further includes
  a plurality of detent magnets mounted in an equally radially spaced apart manner about the exterior of said housing and about said metering chamber to attract one of said actuating magnets.